US00RE37870E

(19) United States
(12) Reissued Patent
Nakano et al.

(10) Patent Number: US RE37,870 E
(45) Date of Reissued Patent: Oct. 8, 2002

(54) CDMA/TDD RADIO COMMUNICATION SYSTEM

(75) Inventors: Takayuki Nakano, Kanazawa; Kazuyuki Miya, Machida; Osamu Kato; Masatoshi Watanabe, both of Yokohama, all of (JP)

(73) Assignee: Matsushita Electric Industrial Co., Ltd., Osaka (JP)

(21) Appl. No.: 09/154,709

(22) Filed: Sep. 17, 1998

Related U.S. Patent Documents

Reissue of:
(64) Patent No.: 5,559,789
Issued: Sep. 24, 1996
Appl. No.: 08/369,485
Filed: Jan. 6, 1995

(30) Foreign Application Priority Data

Jan. 31, 1994 (JP) ..... 6-009610
Feb. 16, 1994 (JP) ..... 6-019366

(51) Int. Cl.[7] ..... H04J 13/04
(52) U.S. Cl. ..... 370/342; 455/13.4
(58) Field of Search ..... 370/241, 247, 370/310, 318, 317, 320, 321, 332, 352, 441, 442, 311, 314, 329, 331, 333–338, 341–347, 350, 349; 455/38.3, 69, 13.4, 560, 561, 571, 572, 442, 439; 375/200, 130, 140, 137, 145

(56) References Cited

U.S. PATENT DOCUMENTS 5,056,109 A 10/1991 Gilhousen et al. ..... 370/342
5,103,459 A 4/1992 Gilhousen et al. ..... 370/342
5,245,629 A * 9/1993 Hall ..... 375/100
5,257,283 A * 10/1993 Gilhousen ..... 370/342
5,265,119 A 11/1993 Gilhousen et al.
5,267,262 A 11/1993 Wheatley, III
5,278,992 A 1/1994 Su et al.
5,383,220 A * 1/1995 Murai ..... 375/200
5,420,850 A 5/1995 Umeda et al.

FOREIGN PATENT DOCUMENTS

EP 0154338 A2 9/1985
EP 0565505 A2 10/1993
GB 2268365 1/1994
WO 92 22161 12/1992
WO 93 21699 10/1993

OTHER PUBLICATIONS

Mobile Radio Communications, Raymond Steele (Ed), 1992, Pentech Press Limited, London.
EPO Search Report dated Oct. 21, 1998.
Riaz Esmailzadeh, et al. "Power Control in Packet Switched Time Division Duplex Direct Sequence Spread Spectrum Communications"; IEEE Vehicular Technology Society 42$^{nd}$, VTS Conference, pp. 989–992, 1992.
International Search Report dated Mar. 6, 2001.

* cited by examiner

*Primary Examiner*—Dang Ton
(74) *Attorney, Agent, or Firm*—Stevens, Davis, Miller & Mosher, LLP

(57) ABSTRACT

In addition to a structure of a conventional CDMA/TDD radio communication system, a base station includes a pilot signal generating circuit for generating a pilot signal that has a constant transmission power level and is known in mobile units and a pilot channel spreading circuit for transmitting the pilot signal to the mobile units through a transmission line. Each of the mobile units includes a pilot signal reception level measuring circuit for measuring reception power of the received pilot signal and a transmission power control circuit for controlling transmission power of a power amplification circuit based on the measured reception power of the received pilot signal.

16 Claims, 5 Drawing Sheets

CDMA/TDD RADIO COMMUNICATION SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a CDMA/TDD radio communication system.

2. Description of the Related Art

Demand for land mobile communication devices such as car telephones and portable telephones is increasing remarkably, and a frequency effective utilization technique for securing larger subscriber capacity in a limited frequency band have become important in recent years. A code-division multiple access (CDMA) system attracts attention as one of multiple access systems for frequency effective utilization. In the CDMA system, when a signal level from a mobile unit near a base station is high in a reverse link from the mobile unit to the base station, such a near-far problem that a signal from another mobile unit become unreceivable is generated. Thus, it is required to control transmission power of the mobile unit so that the base station receives the signal from any mobile unit at the same level.

On the other hand, since propagation conditions both for transmission and reception are the same in a time division duplex (TDD) system in which transmission and reception are performed in the same frequency band, when the propagation condition on one side is known, the propagation condition on the other side can be known. With this, it is possible to measure the reception power at the mobile unit and to control the transmission power of the mobile unit based on the measured value.

Transmission power control techniques in a conventional CDMA/TDD radio communication system will be described hereinafter with reference to FIG. 1. In FIG. 1, reference numeral 1 represents a base station, 2 a mobile unit, 3 a data channel spreading circuit for spreading a first transmitted data 11 from the base station 1, 4 a despreading circuit for obtaining a first received data 12, 5 a transmission line, 6 a data channel despreading circuit for obtaining a second received data 13 in the mobile unit 2, 7 a data signal reception level measuring circuit for measuring the level of the second received data 13, 8 a transmission power control circuit for controlling the transmission power of the mobile unit in accordance with the reception level, 9 a spreading circuit for spreading a second transmission data 14 from the mobile unit 2, and 10 a power amplification circuit.

Next, the operation of the conventional example described above will be explained. In the base station 1, the first transmitted data 11 are spread by means of the data channel spreading circuit 3. The spread signal is transmitted to the mobile unit 2 through the transmission line 5 after being added to the spread signals of other channels. The signal received by the mobile unit 2 is despread in the data channel despreading circuit 6 to obtain the second received data 13. In the data signal reception level measuring circuit 7, the reception level is measured with the second received data 13. In the transmission power control circuit 8, attenuation in the transmission line 5 is estimated based on the measured value of the reception level to determine the transmission power when the mobile unit 2 spreads the second transmitted data 14 by the spreading circuit 9 and transmits those data after amplification in the power amplification circuit 10. The data transmitted from the mobile unit 2 through the transmission line 5 are despread by the despreading circuit 4 in the base station 1 to obtain the first received data 12. When the power level of the first transmitted data 11 transmitted from the base station 1 is constant, it is possible to obtain the attenuation of the transmission line 5 accurately, so that it is possible to control the transmission power of the mobile unit 2 accurately.

In the conventional transmission power control techniques described above, however, it is impossible to obtain the attenuation of the transmission line 5 accurately and to control the transmission power accurately when the transmission power level of the first transmitted data 11 changes. Further, the attenuations of the transmission line 5 estimated in respective mobile units 2 are different due to the fact that the contents of the transmission data transmitted from the base station 1 to respective mobile units 2 are different from one another and separate spreading codes are used, respectively, and the transmission power of respective mobile units 2 is determined based on the estimated attenuation of the transmission line 5. Thus, the power arriving at the base station 1 from respective mobile units 2 becomes uneven.

SUMMARY OF THE INVENTION

The present invention is to solve the above-mentioned conventional problems and has for its object to provide a CDMA/TDD radio communication system capable of controlling transmission power with high precision.

In order to achieve the above-mentioned object, according to the present invention, there is provided, in the base station, a circuit for transmitting a pilot signal that has a constant power level and is known in respective mobile units, and highly precise transmission power control is made based on this pilot signal in respective mobile units.

According to the present invention, it becomes possible to control transmission power accurately and to solve such a problem that communication becomes impossible due to a near-far problem.

DESCRIPTION OF THE PREFERRED EMBODIMENTS

The First Embodiment

Figure 1:
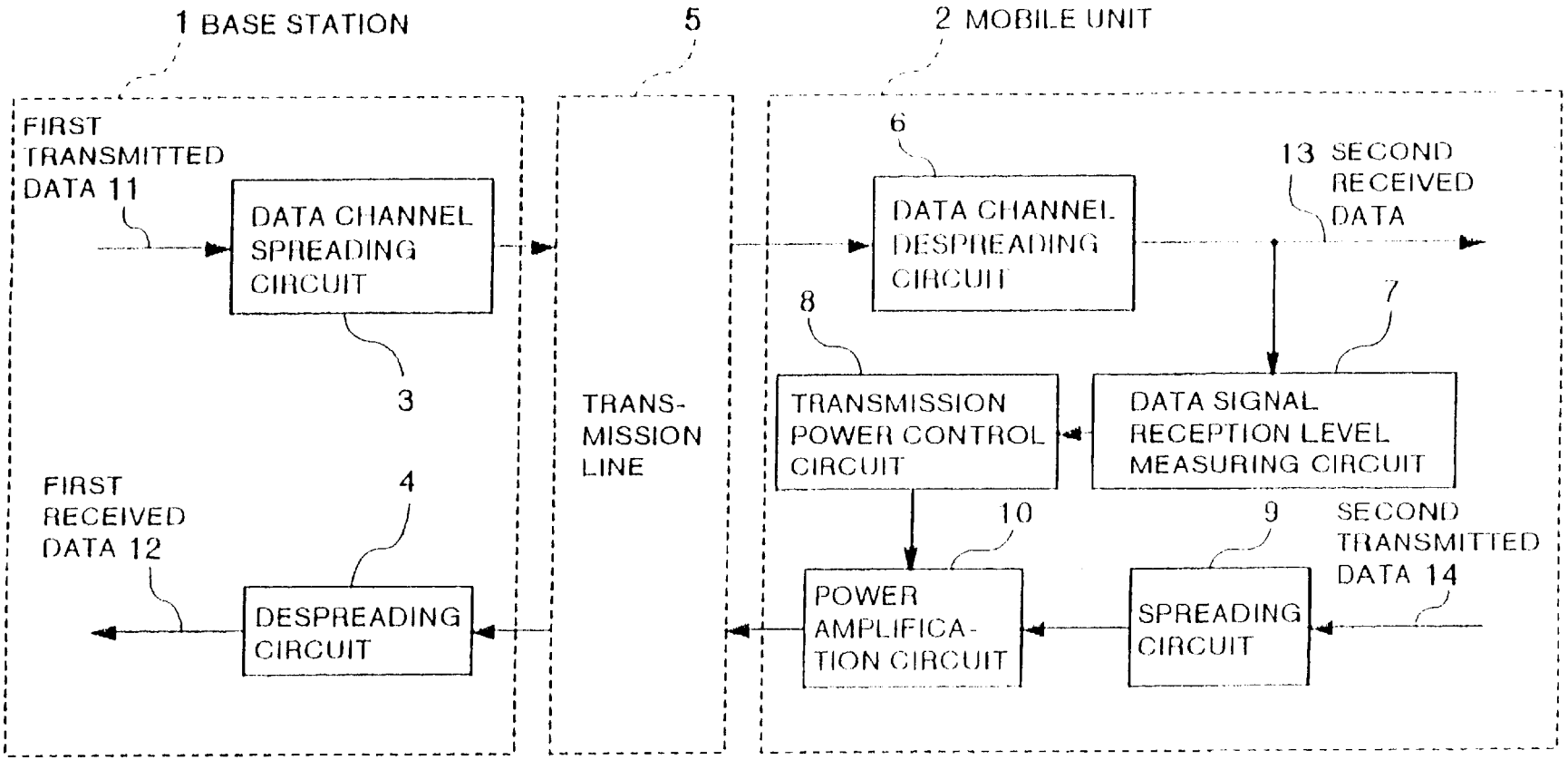
FIG.1 PRIOR ART
FIG. 1 is a schematic block diagram of a conventional CDMA/TDD radio communication system.
Figure 2:
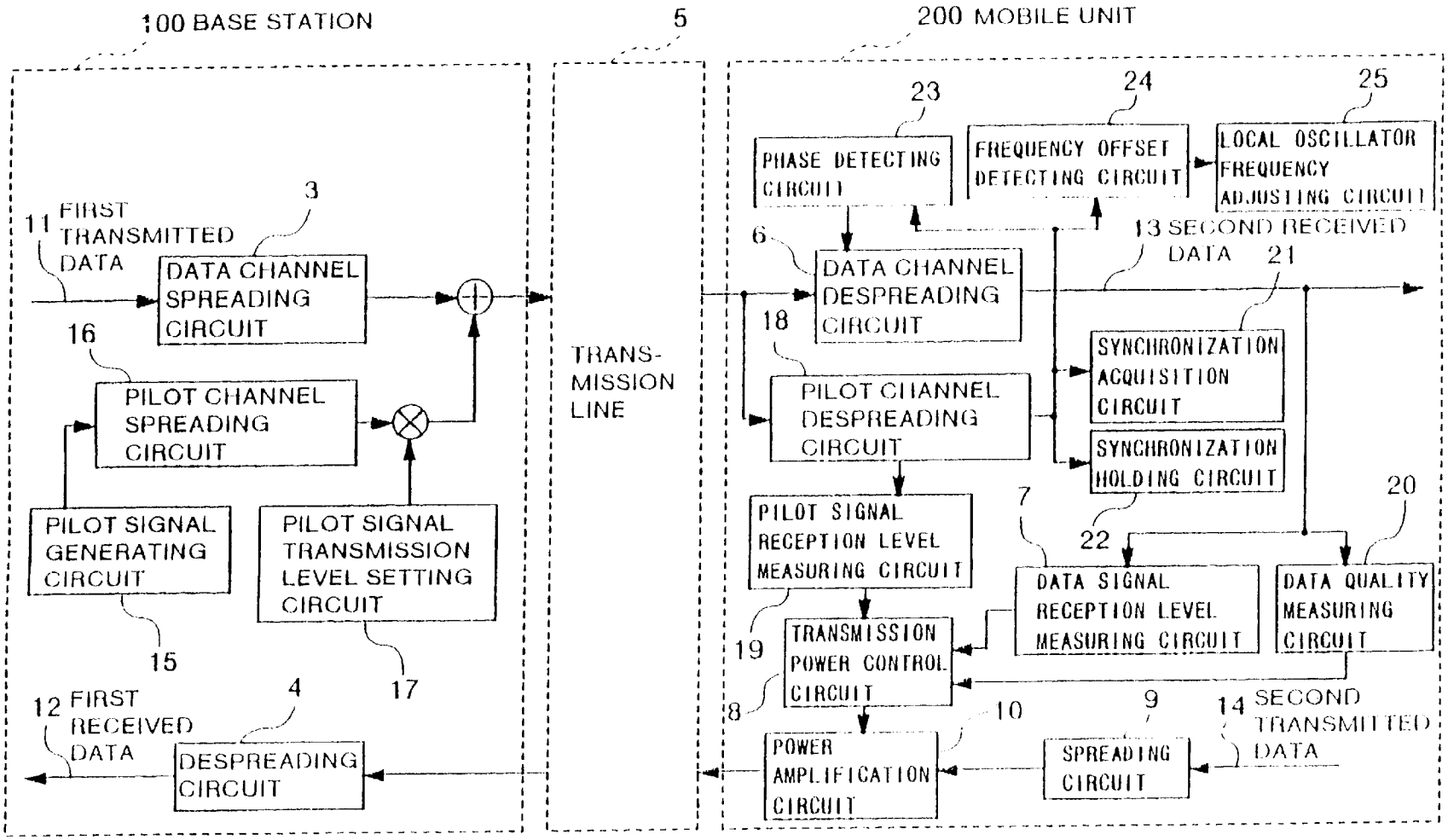
FIG. 2 is a schematic block diagram of a CDMA/TDD radio communication system according to a first embodiment of the present invention.

A first embodiment of the present invention will be described hereinafter with reference to FIG. 2. In FIG. 2, reference numeral 100 represents a base station, 200 represents a mobile unit, and elements that are indicated with reference numerals 3 to 14 are the same as corresponding elements shown in the above-mentioned conventional example in FIG. 1 described above. Reference numeral 15 represents a pilot signal generating circuit for generating a pilot signal that has a constant transmission power level and is known in the mobile unit 200, 16 a pilot channel spreading circuit for spreading the pilot signal, 17 a pilot signal transmission level setting circuit for setting a transmission level of the pilot signal, 18 a pilot channel despreading circuit for obtaining a received pilot signal in the mobile unit 200, 19 a pilot signal reception level measuring circuit for measuring a reception level of the received pilot signal, 20 a data quality measuring circuit for measuring the quality of a second received data 13 such as a bit error rate (BER) or a frame error rate (FER), 21 a synchronization acquisition circuit for acquiring synchronization of spreading codes by the received pilot signal, 22 a synchronization holding circuit for holding synchronization of the spreading codes by the received pilot signal, 23 a phase detecting circuit for obtaining a phase of a carrier wave by the received pilot signal, 24 a frequency offset detecting circuit for obtaining offset of a carrier frequency in a local oscillator in the mobile unit 200, and 25 a local oscillator frequency adjusting circuit for adjusting the frequency of the local oscillator of the mobile unit 200 using the output of the frequency offset detecting circuit 24.

Figure 3:
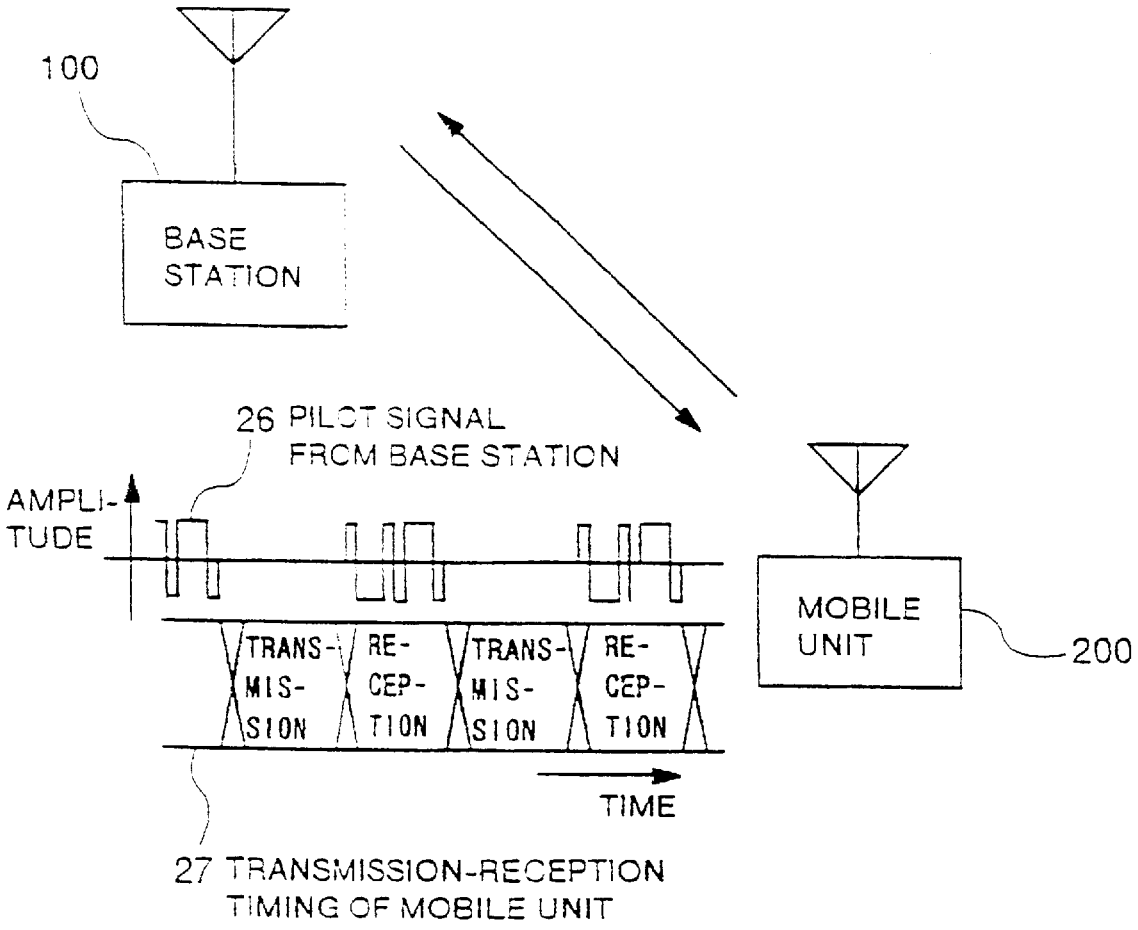
FIG. 3 is a typical diagram showing transmission-reception timing of a pilot signal in the first embodiment of the present invention.

The operation of the CDMA/TDD radio communication system structured as described above will be described with reference to FIGS. 2 and 3. In FIG. 3, reference numeral 26 represents a pilot signal transmitted from the base station 100, and 27 shows transmission-reception timing of the mobile unit 200. In FIG. 2, the pilot signal generating circuit 15 generates a pilot signal that has a constant transmission power level and is known in the mobile unit 200. This pilot signal is transmitted toward the mobile unit 200 on the transmission line 5 in a bursting manner through at least one spreading channel together with the first transmitted data 11 spread by the data channel spreading circuit 3 after being spread by the pilot channel spreading circuit 16. The pilot signal transmitted from the base station 100 through the transmission line 5 is transmitted in the time slot that the mobile unit 200 performs reception as shown in FIG. 3, and the mobile unit 200 obtains the second received data 13 by despreading the data signal by means of the data channel despreading circuit 6 from the signal received in this time slot, and obtains the received pilot signal by despreading the pilot signal by means of the pilot channel despreading circuit 18. The power of the received pilot signal is measured by the pilot signal reception level measuring circuit 19, the power of the second received data 13 is measured by the data signal reception level measuring circuit 7, and the data quality of the second received data 13 is measured by the data quality measuring circuit 20. Then, the transmission power in the power amplification circuit 10 when the second transmitted data 14 is spread by the spreading circuit 9 and transmitted to the base station 100 is controlled by the transmission power control circuit 8 taking not only the reception levels of the received pilot signal and the second received data 13, but also the quality of the data channel into consideration. Alternatively, the transmission power is controlled based on the reception level of the received pilot signal and the data quality only. The data transmitted to the base station 100 from the mobile unit 200 through the transmission line 5 are despread by the despreading circuit 4 to obtain the first received data 12.

Further, since the pilot signal is known in the mobile unit 200, it is possible to perform the synchronization acquisition and synchronization holding of the spread signal by the synchronization acquisition circuit 21 and the synchronization holding circuit 22, the phase detection of the carrier wave by the phase detecting circuit 23, the detection of frequency offset in the local oscillator by the frequency offset detecting circuit 34, and the adjustment for compensating for the shift of the carrier frequency attendant upon Doppler effect from the detected frequency offset by means of the local oscillator frequency adjusting circuit 25 by using the received pilot signal.

Furthermore, in the base station 100, it is possible that the pilot signal transmission level setting circuit 17 lowers a relative level of the interference from the other spreading channels in the received pilot signal by making the transmission power level of the pilot signal higher than any one of the signal levels of the other spreading channels. With this, it is possible to improve the precision of the transmission power control, the synchronization acquisition, the synchronization holding, the phase detection, the frequency offset detection and the local oscillator frequency adjustment which are described previously.

Further, an optional data sequence is assumed for a pilot signal generated by the pilot signal generating circuit 15 of the base station 100, but the pilot signal may be formed of a data sequence of all "1's" or "0's". In this case, the circuit configurations of the pilot signal generating circuit 15, the pilot signal reception level measuring circuit 19, the synchronization acquisition circuit 21, the synchronization holding circuit 22, the phase detecting circuit 23, the frequency offset detecting circuit 24 and the local oscillator frequency adjusting circuit 25 become simple, so that it is possible to curtail the circuit scale.

As described above, according to the embodiment described above, it is possible to estimate the attenuation of the transmission line 5 accurately because the transmission power of the pilot signal transmitted from the base station 100 toward respective mobile units 200 is constant and the pilot signal is known in the respective mobile units 200, and, even when Rayleigh fading is generated with the movement of the mobile unit 200 and the attenuation of the transmission line 5 changes suddenly, such matters can be followed by the pilot signal.

The Second Embodiment

Figure 4:
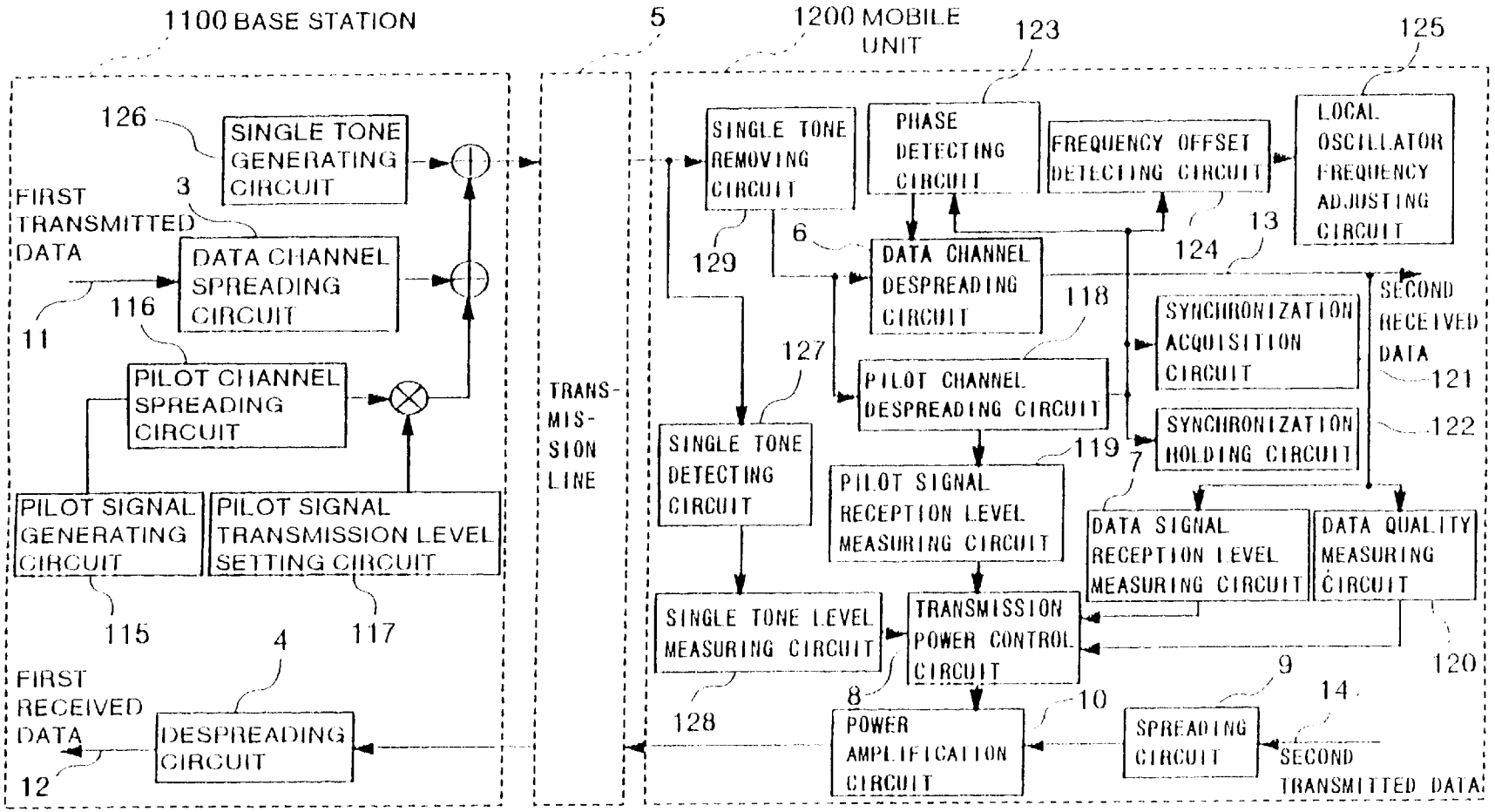
FIG. 4 is a schematic block diagram of a CDMA/TDD radio communication system according to a second embodiment of the present invention.

A second embodiment of the present invention will be described hereinafter with reference to FIG. 4. In FIG. 4, reference numeral 1100 represents a base station, 1200 represents a mobile unit, and elements that are indicated with reference numerals 3 to 14 are the same as corresponding elements shown in the conventional example in FIG. 1 described above except the control in the transmission power control circuit 8. Reference numeral 115 represents a pilot signal generating circuit for generating a pilot signal that has a constant transmission power level and is known in the mobile unit 1200, 116 a pilot channel spreading circuit for spreading the pilot signal, 117 a pilot signal transmission level setting circuit for setting the transmission level of the pilot signal, 118 a pilot channel despreading circuit for obtaining the received pilot signal in the mobile unit 1200, 119 a pilot signal reception level measuring circuit for measuring the reception level of the received pilot signal, 120 a data quality measuring circuit for measuring the quality of the second received data 13 such as a bit error rate (BER) or a frame error rate (FER), 121 a synchronization acquisition circuit for acquiring the synchronization of spreading codes by the received pilot signal, 122 a synchronization holding circuit for holding the synchronization of spreading codes by the received pilot signal, 123 a phase detecting circuit for obtaining the phase of the carrier wave by the received pilot signal, 124 a frequency offset detecting circuit for obtaining the offset of the carrier frequency in a local oscillator of the mobile unit 1200, 125 a local oscillator frequency adjusting circuit for adjusting the frequency of the local oscillator of the mobile unit 1200 using the output of the frequency offset detecting circuit 124, 126 a single tone generating circuit provided in the base station 1100, 127 a single tone detecting circuit for taking a single tone (a single sine wave) out of the received signal, 128 a single tone level measuring circuit for measuring a single tone reception power level, and 129 a single tone removing circuit for removing single tone components from the received signal.

Figure 5:
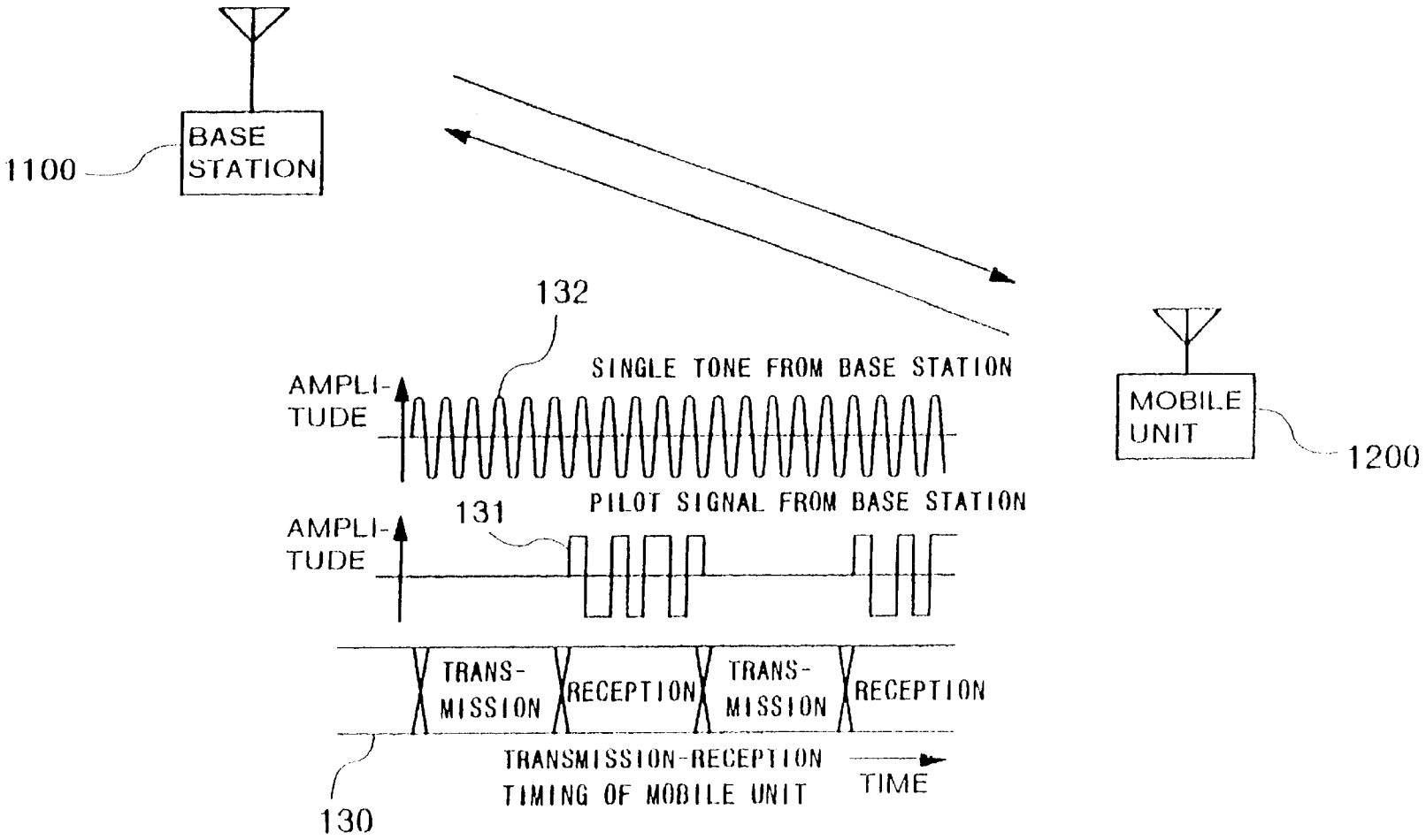
FIG. 5 is a typical diagram showing transmission-reception timing and a waveform of a single tone of a pilot signal in the second embodiment of the present invention.

The operation of the CDMA/TDD radio communication system thus structured will be described with reference to FIGS. 4 and 5. In FIG. 5, reference numeral 130 represents transmission-reception timing of the mobile unit 1200, 131 a pilot signal transmitted from the base station 1100, and 132 a single tone transmitted from the base station 1100. In FIG. 4, the pilot signal generating circuit 115 generates the pilot signal that has a constant transmission power level and is known in the mobile unit 1200. This pilot signal is transmitted toward the mobile unit 1200 on the transmission line 5 in a bursting manner through at least one spreading channel together with the first transmission data 11 spread by the data channel spreading circuit 3 after being spread by the pilot channel spreading circuit 116. The pilot signal transmitted from the base station 1100 through the transmission line 5 is transmitted in the time slot that the mobile unit 1200 performs reception as shown in FIG. 5, and the mobile unit 1200, after removing the single tone first by the single tone removing circuit 129 from the signal received in this time slot, obtains the second received data 13 by spreading the data signal by the data channel despreading circuit 6 and obtains the received pilot signal by spreading the data signal by the pilot channel despreading circuit 118. The reception power of the received pilot signal is measured by the pilot signal reception level measuring circuit 119, and the received power of the second received data 13 is measured by the data signal reception level measuring circuit 7. The quality of the second received data 13 is measured by the data quality measuring circuit 120. Then, the transmission power in the power amplification circuit 10 when the second transmitted data 14 are spread by the spreading circuit 9 and transmitted to the base station 1100 is controlled by the transmission power control circuit 8 taking not only the reception levels of the received pilot signal and the second received data 13, but also the quality of the data channel into consideration. Otherwise, control is made based on the reception level of the received pilot signal and the data quality only. The data transmitted from the mobile unit 1200 to the base station 1100 through the transmission line 5 are despread by means of the despreading circuit 4 to obtain the first received data 12.

On the other hand, a single tone 132 such as shown in FIG. 5 is always transmitted from the single tone generating circuit 126 in the base station 1100, and the mobile unit 1200 can follow even a sudden change in a transmission line state such as shadowing even in the time slot for performing transmission by monitoring the state of the transmission line 5 from this single tone. Namely, the single tone transmitted from the base station 1100 is detected by the single tone detecting circuit 127 of the mobile unit 1200 and the reception level thereof is measured by the single tone level measuring circuit 128, and the transmission power control circuit 8 controls the transmission power in the transmission power amplification circuit 10 taking the reception level of the measured single tone, the reception level of the received pilot signal described above, the reception level of the data signal and/or the data quality into consideration.

Further, since the pilot signal is known in the mobile unit 1200, it is possible to perform the synchronization acquisition and synchronization holding of the spread signal by the synchronization acquisition circuit 121 and the synchronization holding circuit 122, the detection of the phase of the carrier wave by the phase detecting circuit 123, the detection of frequency offset in the local oscillator by the frequency offset detecting circuit 124, and the adjustment for compensating for the shift of the carrier frequency attendant upon the Doppler effect from the frequency offset detected by the local oscillator frequency adjusting circuit 125 using the received pilot signal.

Furthermore, in the base station 1100, the pilot signal transmission level setting circuit 117 can lower the relative level of interference by another spreading channel in the received pilot signal by making the transmission power level of the pilot signal higher than the signal level of other spreading channels. With this, it is possible to improve precision of the transmission power control, the synchronization acquisition, the synchronization holding, the phase detection, the frequency offset detection and the local oscillator frequency adjustment described above.

Further, although an optional data sequence is assumed for the pilot signal generated by the pilot signal generating circuit 115 of the base station 1100, the pilot signal may also be formed of the data sequence of all "1's" or "0's". In this case, the circuit configurations of the pilot signal generating circuit 115, the pilot signal reception level measuring circuit 119, the synchronization acquisition circuit 121, the synchronization holding circuit 122, the phase detecting circuit 123, the frequency offset detecting circuit 124 and the local oscillator frequency adjusting circuit 125 become simple, so that it is possible to curtail the circuit scale.

As described above, according to the second embodiment, it is possible to estimate the attenuation of the transmission line 5 accurately because the transmission power level of the pilot signal transmitted from the base station 1100 toward respective mobile units 1200 is constant and the pilot signal is known in the mobile units 1200, and, even when Rayleigh fading is generated and the attenuation of the transmission line 5 is changed suddenly attendant upon movement of the mobile unit 1200, such matters can be followed by the pilot signal. Further, since the single tone having a constant transmission power level and a single frequency is always transmitted from the base station 1100 toward the respective mobile units 1200, respective mobile units 1200 are able to monitor the state of the transmission line 5 also in the time slot for performing transmission and to follow a sudden state change of the transmission line such as shadowing.

We claim:

1. A code-division multiple access/time division duplex radio communication system comprising a base station and one or more mobile units, wherein:

said base station comprises:

pilot signal generating means for generating a pilot signal which has a constant transmission power level and which has contents that are previously known in said one or more mobile units;

pilot signal spreading means for spreading said pilot signal in accordance with spreading codes to generate a spread pilot signal; and pilot signal transmitting means for transmitting said spread pilot signal in a bursting manner to said one or more mobile units; and each of said mobile units comprises:

pilot signal despreading means for despreading said spread pilot signal to obtain said pilot signal;

pilot signal level measuring means for measuring a reception power of said pilot signal obtained by said despreading means; and transmission power control means for controlling a transmission power based on the measured reception power of said pilot signal obtained by said despreading means.

[2. A radio communication system according to claim 1, wherein each of said mobile units further comprises synchronization acquisition means for acquiring synchronization of the spreading codes by the spread pilot signal transmitted from said base station.]

[3. A radio communication system according to claim 1, wherein each of said mobile units further comprises synchronization holding means for holding synchronization of said spreading codes by the spread pilot signal transmitted from said base station.]

[4. A radio communication system according to claim 1, wherein each of said mobile units further comprises:

phase detecting means for obtaining a phase of a carrier wave by the spread pilot signal transmitted from said base station; and despreading means for demodulating data utilizing an output of said phase detecting means.]

[5. A radio communication system according to claim 1, wherein each of said mobile units further comprises:

a local oscillator;

frequency offset detecting means for obtaining an offset of a carrier frequency in said local oscillator based on the spread pilot signal transmitted from said base station; and frequency adjusting means for adjusting a frequency of the local oscillator using an output of said frequency offset detecting means.]

[6. A radio communication according to claim 1, wherein each of said mobile units further comprises:

synchronization acquisition means for acquiring synchronization of the spreading codes by the spread pilot signal transmitted from said base station;

synchronization holding means for holding synchronization of the spreading codes by the spread pilot signal transmitted from said base station;

phase detection means for obtaining a phase of a carrier wave by the spread pilot signal transmitted from said base station;

despreading means for demodulating data utilizing an output of said phase detection means;

frequency offset detection means for obtaining an offset of a carrier frequency in a local oscillator of said mobile unit based on the spread pilot signal transmitted from said base station; and frequency adjusting means for adjusting a frequency of the local oscillator of said mobile unit using an output of said frequency offset detection means.]

[7. A radio communication system according to any one of claim 1 to claim 6, wherein an output of said pilot signal generating means is a data sequence of all "1's" or a data sequence of all "0's".]

[8. A radio communication system according to any of claim 1 to claim 6, wherein said base station further comprises pilot signal transmission level setting means for setting a transmission power of the pilot signal, which is to be transmitted, larger than a transmission power of a signal of another spreading channel.]

[9. A radio communication system according to claim 8, wherein an output of said pilot signal generating means is a data sequence of all "1's" or data sequence of all "0's".]

[10. A radio communication system according to claim 1, wherein:

each of said mobile units further comprises data signal level measuring means for measuring a reception power of a data signal transmitted thereto; and said transmission power control means controls the transmission power based on outputs of said pilot signal level measuring means and said data signal level measuring means.]

[11. A radio communication system according to claim 10, wherein each of said mobile units further comprises:

synchronization acquisition means for acquiring synchronization of the spreading codes by the spread pilot signal transmitted from said base station;

synchronization holding means for holding synchronization of the spreading codes by the spread pilot signal transmitted from said base station;

phase detection means for obtaining a phase of a carrier wave by the spread pilot signal transmitted from said base station;

despreading means for demodulating data utilizing an output of said phase detection means;

a local oscillator;

frequency offset detection means for obtaining an offset of a carrier frequency in said local oscillator based on the spread pilot signal transmitted from said base station; and frequency adjusting means for adjusting a frequency of the local oscillator using an output of said frequency offset detection means.]

[12. A radio communication system according to claim 10 or claim 11, wherein an output of said pilot signal generating means is a data sequence of all "1's" or a data sequence of all "0's".]

[13. A radio communication system according to claim 1, wherein:

each of said mobile units further comprises data quality measuring means for measuring a quality of received data; and said transmission power control means controls the transmission power based on outputs of said pilot signal level measuring means and said data quality measuring means.]

[14. A radio communication system according to claim 13, wherein each of said mobile units further comprises:

synchronization acquisition means for acquiring synchronization of said spreading codes by the spread pilot signal transmitted from said base station;

synchronization holding means for holding synchronization of said spreading codes by the spread pilot signal transmitted from said base station;

phase detection means for obtaining a phase of a carrier wave by the spread pilot signal transmitted from said base station;

despreading means for demodulating data utilizing an output of said phase detection means;

a local oscillator;

frequency offset detection means for obtaining an offset of a carrier frequency in said local oscillator based on the spread pilot signal transmitted from said base station; and frequency adjusting means for adjusting a frequency of the local oscillator using an output of said frequency offset detection means.]

[15. A radio communication system according to claim 13 or claim 14, wherein an output of said pilot signal generating means is a data sequence of all "1's" or a data sequence of all "0's".]

[16. A radio communication system according to claim 1, wherein:

each of said mobile units further comprises data signal level measuring means for measuring a reception power of a data signal transmitted thereto and data quality measuring means for measuring a quality of received data; and said transmission power control means controls the transmission power based on outputs of said pilot signal level measuring means, said data signal level measuring means and said data quality measuring means.]

[17. A radio communication system according to claim 16, wherein each of said mobile units further comprises:

synchronization acquisition means for acquiring synchronization of said spreading codes by the spread pilot signal transmitted from said base station;

synchronization holding means for holding synchronization of said spreading codes by the spread pilot signal transmitted from said base station;

phase detection means for obtaining a phase of a carrier wave by the spread pilot signal transmitted from said base station;

despreading means for demodulating data utilizing an output of said phase detection means;

a local oscillator;

frequency offset detection means for obtaining an offset of a carrier frequency in said local oscillator based on the spread pilot signal transmitted from said base station; and frequency adjusting means for adjusting a frequency of the local oscillator using an output of said frequency offset detection means.]

[18. A radio communication system according to claim 16 or claim 17, wherein an output of said pilot signal generating means is a data sequence of all "1's" or a data sequence of all "0's".]

[19. A radio communication system according to claim 1, wherein:

said base station further comprises single tone transmission means for transmitting a single tone having a constant transmission power level and a single frequency to said mobile units;

each of said mobile units further comprises single tone level measuring means for measuring a reception power of said single tone; and said transmission power control means controls the transmission power based on outputs of said pilot signal level measuring means and said single tone level measuring means.]

[20. A radio communication system according to claim 19, wherein each of said mobile units further comprises synchronization acquisition means for acquiring synchronization of said spreading codes by the spread pilot signal transmitted from said base station.]

[21. A radio communication system according to claim 19, wherein each of said mobile units further comprises synchronization holding means for holding synchronization of said spreading codes by the spread pilot signal transmitted from said base station.]

[22. A radio communication system according to claim 19, wherein each of said mobile units further comprises:

phase detection means for obtaining a phase of a carrier wave by the spread pilot signal transmitted from said base station; and despreading means for demodulating data utilizing an output of said phase detection means.]

[23. A radio communication system according to claim 19, wherein each of said mobile units further comprises:

a local oscillator;

frequency offset detection means for obtaining an offset of a carrier frequency in said local oscillator based on the spread pilot signal transmitted from said base station; and frequency adjusting means for adjusting a frequency of the local oscillator using an output of said frequency offset detection means.]

[24. A radio communication system according to claim 19, wherein each of said mobile units further comprises:

synchronization acquisition means for acquiring synchronization of the spreading codes by the spread pilot signal transmitted from said base station;

synchronization holding means for holding synchronization of the spreading codes by the spread pilot transmitted from said base station;

phase detection means for obtaining a phase of a carrier wave by the spread pilot signal transmitted from said base station;

despreading means for demodulating data utilizing an output of said phase detection means;

a local oscillator;

frequency offset detection means for obtaining an offset of a carrier frequency in said local oscillator based on the spread pilot signal transmitted from said base station; and frequency adjusting means for adjusting a frequency of the local oscillator using an output of said frequency offset detection means.]

[25. A radio communication system according to any one of claim 19 or claim 24, wherein an output of said pilot signal generating means is a data sequence of all "1's" or a data sequence of all "0's".]

[26. A radio communication system according to any of claim 19 to claim 24, wherein said base station further comprises pilot signal transmission level setting means for setting a transmission power of the pilot signal, which is to be transmitted, larger than a transmission power of a signal of another spreading channel.]

[27. A radio communication system according to claim 8, wherein an output of said pilot signal generating means is a data sequence of all "1's" or data sequence of all "0's".]

[28. A radio communication system according to claim 10, wherein:

said base station further comprises single tone transmission means for transmitting a single tone having a constant transmission power level and a single frequency to said mobile units;

each of said mobile units further comprises single tone level measuring means for measuring a reception power of said single tone; and said transmission power control means controls the transmission power based on outputs of said pilot signal level measuring means, said data signal level measuring means and said single tone level measuring means.]

[29. A radio communication system according to claim 28, wherein each of said mobile units further comprises:

synchronization acquisition means for acquiring synchronization of said spreading codes by the spread pilot signal transmitted from said base station;

synchronization holding means for holding synchronization of said spreading codes by the spread pilot signal transmitted from said base station;

phase detection means for obtaining a phase of a carrier wave by the pilot signal transmitted from said base station;

despreading means for demodulating data utilizing an output of said phase detection means;

a local oscillator;

frequency offset detection means for obtaining an offset of a carrier frequency in said local oscillator based on the spread pilot signal transmitted from said base station; and frequency adjusting means for adjusting a frequency of the local oscillator using an output of said frequency offset detection means.]

[30. A radio communication system according to claim 28 or claim 29, wherein an output of said pilot signal generating means is a data sequence of all "1's" or a data sequence of all "0's".]

[31. A radio communication system according to claim 13, wherein:

said base station further comprises single tone transmission means for transmitting a single tone having a constant transmission power level and a single frequency to said mobile units;

each of said mobile units further comprises single tone level measuring means for measuring a reception power of said single tone; and said transmission power control means controls the transmission power based on outputs of said pilot signal level measuring means, said data quality measuring means and said single tone level measuring means.]

[32. A radio communication system according to claim 31, wherein each of said mobile units further comprises:

synchronization acquisition means for acquiring synchronization of the spreading codes by the spread pilot signal transmitted from said base station;

synchronization holding means for holding synchronization of said spreading codes by the spread pilot signal transmitted from said base station;

phase detection means for obtaining a phase of a carrier wave by the spread pilot signal transmitted from said base station;

despreading means for demodulating data utilizing an output of said phase detection means;

a local oscillator;

frequency offset detection means for obtaining an offset of a carrier frequency in said local oscillator based on the spread pilot signal transmitted from said base station; and frequency adjusting means for adjusting a frequency of the local oscillator using an output of said frequency offset detection means.]

[33. A radio communication system according to claim 31 or claim 32, wherein an output of said pilot signal generating means is a data sequence of all "1's" or a data sequence of all "0's".]

[34. A radio communication system according to claim 16, wherein:

said base station further comprises single tone transmission means for transmitting a single tone having a constant transmission power level and a single frequency to said mobile units;

each of said mobile units further comprises single tone level measuring means for measuring a reception power of said single tone; and said transmission power control means controls the transmission power based on outputs of said pilot signal level measuring means, said data single level measuring means, said data quality measuring means and said single tone level measuring means.]

[35. A radio communication system according to claim 34, wherein each of said mobile units further comprises:

synchronization acquisition means for acquiring synchronization of said spreading codes by the spread pilot signal transmitted from said base station;

synchronization holding means for holding synchronization of said spreading codes by the spread pilot signal transmitted from said base station;

phase detection means for obtaining a phase of a carrier wave by the spread pilot signal transmitted from said base station;

despreading means for demodulating data utilizing an output of said phase detection means;

a local oscillator;

frequency offset detection means for obtaining an offset of a carrier frequency in said local oscillator based on the spread pilot signal transmitted from said base station; and frequency adjusting means for adjusting a frequency of the local oscillator using an output of said frequency offset detection means.]

[36. A CDMA/TDD radio communication system according to claim 34 or claim 35, wherein an output of said pilot signal generating means is a data sequence of all "1's" or a data sequence of all "0's".]

*37. A code division multiple access/time division duplex radio communication system comprising a base station and, a mobile unit, wherein:*

*said base station comprises means for transmitting a data signal and a pilot signal, which has a constant transmission power level, to said mobile unit through at least one spreading channel; and*

*said mobile unit comprises means for controlling transmission power based on a reception power of said pilot signal and a reception power of said data signal transmitted to said mobile unit.*

*38. A code division multiple access/time division duplex radio communication system comprising a base station and a mobile unit, wherein:*

*said base station comprises means for transmitting a pilot signal, which has a constant transmission power level, to said mobile unit through at least one spreading channel; and*

*said mobile unit comprises means for controlling transmission power based on (i) a reception power of said pilot signal and (ii) a quality of received data, said quality being determined by measuring an error rate comprising at least one of a bit error rate and a frame error rate.*

*39. A code division multiple access/time division duplex radio communication system comprising a base station and a mobile unit, wherein:*

*said base station comprises means for transmitting a data signal and a pilot signal, which has a constant trans-*

*mission power level, to said mobile unit through at least one spreading channel; and*

*said mobile unit comprises means for controlling transmission power based on (i) a reception power of said pilot signal, (ii) a reception power of said data signal transmitted to said mobile unit and (iii) a quality of received data, said quality being determined by measuring an error rate comprising at least one of a bit error rate and a frame error rate.*

*40. A code division multiple access/time division duplex mobile unit comprising:*

*means for determining a reception power of a pilot signal which is transmitted from a base station at a constant level and a reception power of a data signal which is transmitted from said base station; and*

*means for controlling transmission power based on said determined reception power of said pilot signal and said determined reception power of said data signal.*

*41. A code division multiple access/time division duplex mobile unit comprising:* means for determining a reception power of a pilot signal which is transmitted from a base station at a constant level, a reception power of a data signal which is transmitted from said base station, and a quality of received data transmitted from said base station, said quality being determined by measuring an error rate comprising at least one of a bit error rate and a frame error rate; and

*means for controlling transmission power based on said determined reception power of said pilot signal, said determined reception power of said data signal, and said determined quality of said received data.*

*42. A mobile unit according to claim 40 or 41 further comprising synchronization acquisition means for acquiring synchronization of a spreading signal by said pilot signal transmitted from said base station.*

*43. A mobile unit according to claim 40 or 41 further comprising synchronization holding means for holding synchronization of a spreading signal by said pilot signal transmitted from said base station.*

*44. A mobile unit according to claim 40 or 41 further comprising:*

*phase detecting means for obtaining a phase of a carrier wave by said pilot signal transmitted from said base station; and*

*despreading means for demodulating data utilizing an output of said phase detecting means.*

*45. A mobile unit according to claim 40 or 41 further comprising:*

*frequency offset detecting means for obtaining an offset of a carrier frequency in a local oscillator of said mobile unit by said pilot signal transmitted from said base station; and*

*frequency adjusting means for adjusting a frequency of said local oscillator of said mobile unit using an output of said frequency offset detecting means.*

*46. A code division multiple access/time division duplex base station comprising:*

*means for generating a pilot signal which has a constant transmission power level and which has contents that are previously known in a mobile unit; and*

*means for transmitting said pilot signal in a burst manner through at least one spreading channel.*

*47. A base station according to claim 46 further comprising pilot signal transmission level setting means for setting a transmission power of said pilot signal, which is to be transmitted, larger than a transmission power of a signal of another spreading channel.*

*48. A base station according to claim 46 or 47 wherein an output of said means for generating a pilot signal is a data sequence of all "1's" or a data sequence of all "0's".*

*49. A code division multiple access/time division duplex radio communication method between a base station and a mobile unit comprising the steps of:*

*transmitting, in said base station, a data signal and a pilot signal through at least one spreading channel, said pilot signal having a constant transmission power level; and*

*controlling, in said mobile unit, transmission power based on a reception power of said pilot signal and a reception power of said data signal transmitted from said base station.*

*50. A code division multiple access/time division duplex radio communication method between a base station and a mobile unit, comprising the steps of:*

*transmitting, in said base station, a pilot signal through at least one spreading channel, said pilot signal having a constant transmission power level; and*

*controlling, in said mobile unit, transmission power based on a reception power of said pilot signal and a quality of received data, said quality being determined by measuring an error rate comprising at least one of a bit error rate and a frame error rate.*

*51. A code division multiple access/time division duplex radio communication method between a base station and a mobile unit, comprising the steps of:*

*transmitting, in said base station, a data signal and a pilot signal through at least one spreading channel, said pilot signal having a constant transmission power level; and*

*controlling, in said mobile unit, transmission power based on a reception power of said pilot signal, a reception power of said data signal transmitted from said base station, and a quality of received data, said quality being determined by measuring an error rate comprising at least one of a bit error rate and a frame error rate.*

* * * * *